United States Patent
Vanstone

(10) Patent No.: US 8,966,271 B2
(45) Date of Patent: *Feb. 24, 2015

(54) DATA CARD VERIFICATION SYSTEM

(75) Inventor: Scott A. Vanstone, Campbellville (CA)

(73) Assignee: Certicom Corp., Mississauga (CA)

(*) Notice: Subject to any disclaimer, the term of this patent is extended or adjusted under 35 U.S.C. 154(b) by 0 days.

This patent is subject to a terminal disclaimer.

(21) Appl. No.: 13/609,153

(22) Filed: Sep. 10, 2012

(65) Prior Publication Data

US 2013/0067233 A1   Mar. 14, 2013

Related U.S. Application Data

(60) Continuation of application No. 12/892,719, filed on Sep. 28, 2010, now Pat. No. 8,307,211, which is a continuation of application No. 12/324,232, filed on Nov. 26, 2008, now Pat. No. 7,822,987, which is a (Continued)

(30) Foreign Application Priority Data

Feb. 3, 1997   (GB) .................................. 9702152.1

(51) Int. Cl.
*H04L 9/32* (2006.01)
*G07F 7/10* (2006.01)
(Continued)

(52) U.S. Cl.
CPC ............ *G07F 7/1008* (2013.01); *G06Q 20/341* (2013.01); *G06Q 20/3674* (2013.01);
(Continued)

(58) Field of Classification Search
CPC ... H04L 9/0825; H04L 9/0802; H04L 9/0813; H04L 9/0844; H04L 9/3263; H04L 63/06
USPC .................... 713/171, 175, 176; 380/283, 286
See application file for complete search history.

(56) References Cited

U.S. PATENT DOCUMENTS 4,748,668 A   5/1988   Shamir et al.
4,890,323 A   12/1989   Beker et al.
(Continued)

FOREIGN PATENT DOCUMENTS

EP   0440800   8/1991
EP   0588339   3/1994
(Continued)

OTHER PUBLICATIONS

Federal Information Processing Standards Publication 186: "Digital Signature Standard (DSS)", The Federal Information Processing Standards Publication Series, National Institute of Standards and Technology (NIST), May 19, 1994. pp. 1-16.*

(Continued)

*Primary Examiner* — Eleni Shiferaw
*Assistant Examiner* — Paul Callahan
(74) *Attorney, Agent, or Firm* — Shahrzad Esmaili; Blake, Cassels & Graydon LLP

(57) ABSTRACT

To verify a pair of correspondents in an electronic transaction, each of the correspondents utilizes respective parts of first and second signature schemes. The first signature scheme is computationally more difficult in signing than verifying and the second signature scheme is computationally more difficult in verifying than signing. The first correspondent signs information according to the first signature scheme, the second correspondent verifies the first signature received from the first correspondent, using the first signature scheme. The second correspondent then signs information according to the second signature scheme and the first correspondent verifies the second signature received from the second correspondent, according to the second signature algorithm. The method thereby allows one of the correspondents in participate with relatively little computing power while maintaining security of the transaction.

19 Claims, 2 Drawing Sheets

Related U.S. Application Data division of application No. 10/185,042, filed on Jul. 1, 2002, now Pat. No. 7,472,276, which is a division of application No. 09/716,223, filed on Nov. 21, 2000, now abandoned, which is a division of application No. 09/016,926, filed on Feb. 2, 1998, now Pat. No. 6,178,507.

(51) Int. Cl.

| | | |
|---|---|---|
| *G06Q 20/34* | (2012.01) | |
| *G06Q 20/36* | (2012.01) | |
| *G06Q 20/38* | (2012.01) | |
| *G06Q 20/40* | (2012.01) | |
| *H04L 9/30* | (2006.01) | |

(52) U.S. Cl.
CPC ...... *G06Q20/3825* (2013.01); *G06Q 20/40975* (2013.01); *G07F 7/1016* (2013.01); *H04L 9/3066* (2013.01); *H04L 9/3249* (2013.01); *H04L 2209/56* (2013.01)
USPC .......... 713/175; 713/171; 713/176; 380/283; 380/286

(56) References Cited

U.S. PATENT DOCUMENTS

| | | | |
|---|---|---|---|
| 4,995,082 A | 2/1991 | Schnorr | |
| 5,159,632 A | 10/1992 | Crandall | |
| 5,218,637 A | 6/1993 | Angebaud et al. | |
| 5,299,263 A | 3/1994 | Beller et al. | |
| 5,396,558 A | 3/1995 | Ishiguro et al. | |
| 5,400,403 A | 3/1995 | Fahn et al. | |
| 5,406,628 A | 4/1995 | Beller et al. | |
| 5,442,707 A * | 8/1995 | Miyaji et al. | 380/30 |
| 5,581,616 A | 12/1996 | Crandall | |
| 5,627,893 A | 5/1997 | Demytko | |
| 5,661,805 A | 8/1997 | Miyauchi | |
| 5,721,781 A | 2/1998 | Deo et al. | |
| 5,748,740 A | 5/1998 | Curry et al. | |
| 5,793,866 A | 8/1998 | Brown et al. | |
| 5,805,702 A | 9/1998 | Curry et al. | |
| 5,825,880 A | 10/1998 | Sudia et al. | |
| 5,870,470 A | 2/1999 | Johnson et al. | |
| 5,881,038 A | 3/1999 | Oshima et al. | |
| 5,907,618 A | 5/1999 | Gennaro et al. | |
| 5,917,913 A | 6/1999 | Wang | |
| 5,955,717 A | 9/1999 | Vanstone | |
| 5,960,084 A | 9/1999 | Angelo | |
| 6,038,549 A | 3/2000 | Davis et al. | |
| 6,041,314 A | 3/2000 | Davis | |
| 6,041,317 A | 3/2000 | Brookner | |
| 6,178,507 B1 | 1/2001 | Vanstone | |
| 7,472,276 B2 | 12/2008 | Vanstone | |

FOREIGN PATENT DOCUMENTS

| | | |
|---|---|---|
| FR | 2536928 | 6/1984 |
| GB | 2309809 A | 8/1997 |
| GB | 2309890 | 8/1997 |
| JP | 06-295154 | 10/1994 |
| JP | 08-101868 | 4/1996 |
| JP | 08-507619 | 6/1996 |
| WO | 91/16691 | 10/1991 |

OTHER PUBLICATIONS

B. Kaliski, "Privacy Enhancement for Electronic Mail, Part IV: Key Certification and Related Services", Internet Engineering Task Force (IETF), Network Working Group (NWG), Request for Comments (RFC) 1424, Feb. 1993, pp. 1-9.*

Ferreira, R.C.; "The Smart Card: A high security tool in EDP": Philips Telecommunication Review; Sep. 1989; pp. 1-19; vol. 47, No. 3, Philips Telecommunicatie Industrie N.V. Hilversum; NL.

Miyaji A., "Elliptic Curves Suitable for Cryptosystems", IEICE Transactions of Fundamentals of Electronics, Communications and Computer Sciences, Jan. 1, 1994; pp. 98-104; vol. E77-A, No. 1.

Schnorr C.P., "Efficient Signature Generation by Smart Cards", Journal of Cryptology, Jan. 1, 1991, pp. 161-174; vol. 4, No. 3.

Koblitz, N.: "Elliptic Curve Cryptosystems", Mathematics of Computation, Jan. 1987; pp. 203-209; vol. 48, No. 177.

Kenji, Koyama et al.; "Elliptic Curve Cryptosystems and Their Applications", IEICE Transactions on Information and Systems; Jan. 1, 1992; pp. 50-57; vol. E75-D, No. 1.

Waleffe, D. De et al.: "Corsair: A Smart Card for Public Key Cryptosystems"; Advances in Cryptology—Proceedings of Crypto, Santa Barbara; Aug. 11-15, 1990; pp. 502-513, No. CONF. 10.

Schneier, B. Applied Cryptography, Second Edition: Protocols, Algorithms and Source Code in C. 1996, pp. 35-36, John Wiley & Sons, Inc.

Blake-Wilson, S. et al.; "Use of Elliptic Curve Cryptography (ECC) Algorithms in Cryptographic Message Syntax (CMS)", RFC 3278; Apr. 2002; The Internet Society.

Housley, R. et al.; "Internet X.509 Public Key Infrastructure Certificate and Certificate Revocation List (CRL) Profile", RFC 3280; Apr. 2022; The Internet Society.

Polk, W. et al., "Algorithms and Identifiers for the Internet X.509 Public Key Infrastructure Certificate and Certificate Revocation List (CRL) Profile"; Sec. 2.2.: Signature Algorithms: RFC 3279; Apr. 2002; The Internet Society.

Kent, S., "Privacy Enhancement for Internet Electronic Mail Part II: Certificate-Based Management"; RFC 1422; Feb. 1993.

Rachkov, V.; Extended European search report from corresponding European Application No. 10185101.2; search completed Apr. 6, 2011.

Summons to attend oral proceedings issued Feb. 11, 2013 in connection with corresponding European Application No. 10185101.2.

Response to the Summons to attend oral proceedings filed Apr. 8, 2013 in connection with corresponding European Application No. 10185101.2.

* cited by examiner

DATA CARD VERIFICATION SYSTEM

CROSS REFERENCE TO RELATED APPLICATIONS

This is a continuation application of U.S. patent application Ser. No. 12/892,719 filed Sep. 28, 2010 and issued under U.S. Pat. No. 8,307,211, which is a continuation of U.S. patent application Ser. No. 12/324,232 filed Nov. 26, 2008 and issued under U.S. Pat. No. 7,822,987 on Oct. 26, 2010, which is a divisional of U.S. patent application Ser. No. 10/185,042 filed on Jul. 1, 2002 and issued under U.S. Pat. No. 7,472,276 on Dec. 30, 2008, which is a divisional of U.S. patent application Ser. No. 09/716,223 filed on Nov. 21, 2000, now abandoned, which is a divisional of U.S. patent application Ser. No. 09/016,926 filed on Feb. 2, 1998 and issued under U.S. Pat. No. 6,178,507 on Jan. 23, 2001, which claims priority from United Kingdom Patent Application No. 9702152.1 filed on Feb. 3, 1997 all of which are hereby incorporated by reference.

BACKGROUND OF THE INVENTION

It has become widely accepted to conduct transactions such as financial transactions or exchange of documents electronically. Automated teller machines (ATMs) and credit cards are widely used for personal transaction and as their use expands so too does the need to verify such transactions increase. A smart card is somewhat like a credit card and includes some processing and storage capability. Smart cards are prone to fraudulent misuse, for example by a dummy terminal which is used to glean information from an unsuspecting user. Thus, before any exchange of critical information takes place between either a terminal and a smart card or vice versa it is necessary to verify the authenticity of the terminal as well as the card. One of these verifications may take the form of "signing" an initial transaction digitally so that the authenticity of the transaction can be verified by both parties involved in the subsequent session. The signature is performed according to a protocol that utilizes a random message, i.e. the transaction and a secret key associated with the party.

The signature must be performed such that the party's secret key cannot be determined. To avoid the complexity of distributing secret keys, it is convenient to utilize a public key encryption scheme in the generation of the signature. Such capabilities are available where the transaction is conducted between parties having access to relatively large computing resources, but it is equally important to facilitate such transactions at an individual level where more limited computing resources available, as in the smart card.

Transaction cards or smart cards are now available with limited computing capacity, but these are not sufficient to implement existing digital signature protocols in a commercially viable manner. As noted above, in order to generate a verification signature it is necessary to utilize a public key inscription scheme. Currently, most public key schemes are based on RSA, but the DSS and the demand for a more compact system are rapidly changing this. The DSS scheme, which is an implementation of a Diffie-Hellman public key protocol, utilizes the set of integers $Z_p$ where p is a large prime. For adequate security, p must be in the order of 512 bits, although the resultant signature may be reduced mod q, where q divides p−1, and may be in the order of 160 bits.

An alternative encryption scheme which was one of the first fully fledged public key algorithms and which works for encryption as well as for digital signatures is known as the RSA algorithm. RSA gets it security from the difficulty of factoring large numbers. The public and private keys are functions of a pair of large (100 to 200 digits or even larger) of prime numbers. The public key for RSA encryption is n, the product of the two primes p and q where p and q must remain secret and e which is relatively prime to (p−1)×(q−1). The encryption key d is equal to $e^{-1}$ (mod(p−1)×(q−1)). Note that d and n are relatively prime.

To encrypt a message m, first divide into a number of numerical blocks such that each block is a unique representation modulo n, then the encrypted message block $c_i$ is simply $m_i^e$ (mod n). To decrypt a message take each encrypted block $c_i$ and compute $m_i = c_i^d$ (mod n).

Another encryption scheme that provides enhanced security at relatively small modulus is that utilizing elliptic curves in the finite field $2^m$. A value of m in the order of 155 provides security comparable to a 512 bit modulus DSS and therefore offers significant benefits in implementation.

Diffie-Hellman public key encryption utilizes the properties of discrete logs so that even if a generator β and the exponentiation $β^k$ is known, the value of k cannot be determined. A similar property exist with elliptic curves where the addition of two points on any curve produces a third point on the curve. Similarly, multiplying a point P on the curve by an integer k produces a further point on the curve. For an elliptic curve, the point kP is simply obtained by adding k copies of the point P together.

However, knowing the starting point and the end point does not reveal the value of the integer k which may then be used as a session key for encryption. The value kP, where P is an initial known point is therefore equivalent to the exponentiation $β^k$. Furthermore, elliptic curve crypto-systems offer advantages over other key crypto-systems when bandwidth efficiency, reduced computation and minimized code space are application goals.

Furthermore, in the context of a smart card and an automated teller machine transaction, there are two major steps involved in the authentication of both parties. The first is the authentication of the terminal by the smart card and the second is the authentication of the smart card by the terminal. Generally, this authentication involves the verification of a certificate generated by the terminal and received by the smart card and the verification of a certificate signed by the smart card and verified by the terminal. Once the certificates have been positively verified the transaction between the smart card and the terminal may continue.

Given the limited processing capability of the smart card, verifications and signature processing performed on the smart card are generally limited to simple encryption algorithms. A more sophisticated encryption algorithm is generally beyond the scope of the processing capabilities contained within the smart card. Thus, there exist a need for a signature verification and generation method which may be implemented on a smart card and which is relatively secure.

SUMMARY OF THE INVENTION

This invention seeks in one aspect to provide a method of data verification between a smart card and a terminal.

In accordance with this aspect there is provided a method for verifying a pair of participants in an electronic transaction, comprising the steps of verifying information received by the second participant from the first participant, wherein the verification is performed according to a first signature algorithm; verifying information received by the first participant from the second participant, wherein the verification is performed according to a second signature algorithm; and whereby the transaction is rejected if either verification fails.

The first signature algorithm may be one which is computationally more difficult in signing than verifying, while the second signature algorithm is more difficult in verifying than signing. In such an embodiment the second participant may participate with relatively little computing power, while security is maintained at a high level.

In a further embodiment, the first signature algorithm is based on an RSA, or DDS type algorithm, and the second signature algorithm is based on an elliptic curve algorithm.

BRIEF DESCRIPTION OF THE DRAWINGS

An embodiment of the invention will now be described by way of example on the reference to the accompanying drawings, in which.

DETAILED DESCRIPTION OF A PREFERRED EMBODIMENT

Figures 1A, 1B:
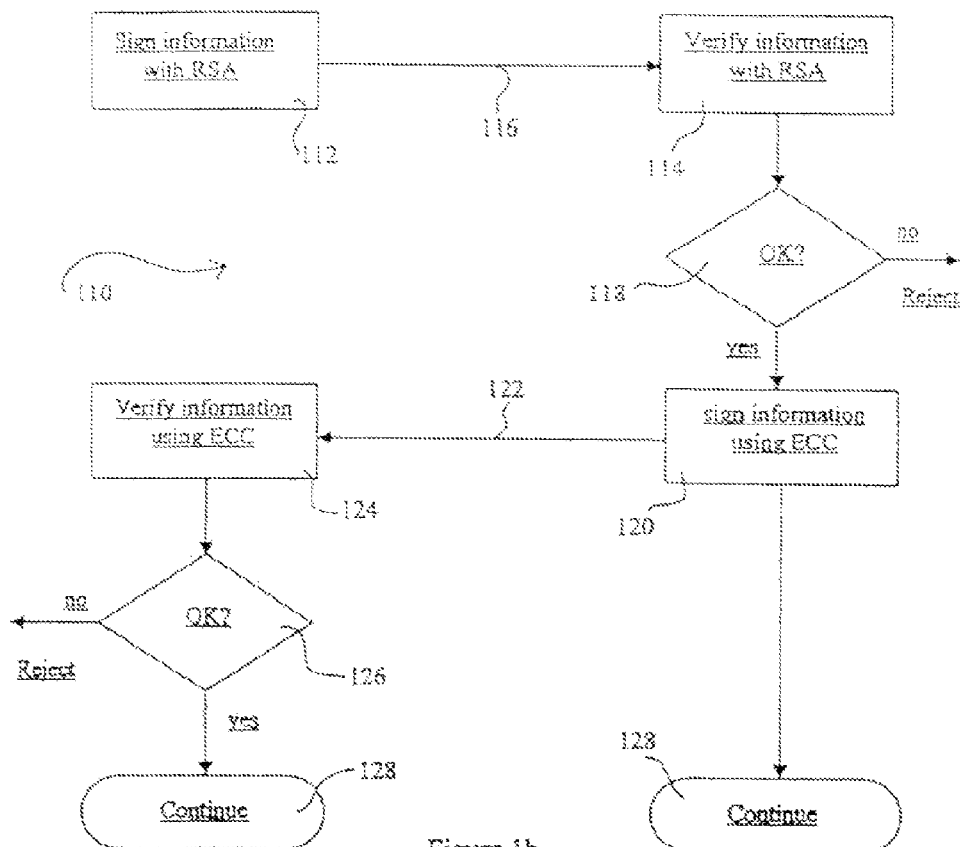
FIG. 1a is a schematic representations showing a smart card and terminal.
FIG. 1b is a schematic representations showing the sequence of events performed during the verification process in a smart card transaction system.

Referring to FIG. 1(a), a terminal 100 is adapted to receive a smart card 102. Typically, insertion of the card 102 into the terminal initiates a transaction. Mutual authentication between the terminal and the card is then performed as shown in FIG. 1b. In very general terms, this mutual authentication is performed according to a "challenge-response" protocol. Generally, card transmits information to the terminal, the terminal 100 signs information with an RSA based algorithm 112 and is then sent to the card 102, which verifies the information with an RSA based algorithm 114. The information exchange 116 between the card and the terminal also includes information generated by the card which is sent to the terminal to be signed by the terminal with an RSA algorithm and returned to the card to be verified utilizing a RSA algorithm. Once the relevant verification has been performed 118, a further step is performed where information is signed by the card using an elliptic curve encryption protocol 120 and submitted to the terminal to be verified 124 by the terminal utilizing an elliptic curve based protocol. Similarly, the information exchange 122 between the card and the terminal may include information generated by the terminal which is sent to the card to be signed by the card and returned to the terminal for verification. Once the appropriate information has been verified 126 the further transactions between the terminal and card may proceed 128.

Figure 2:
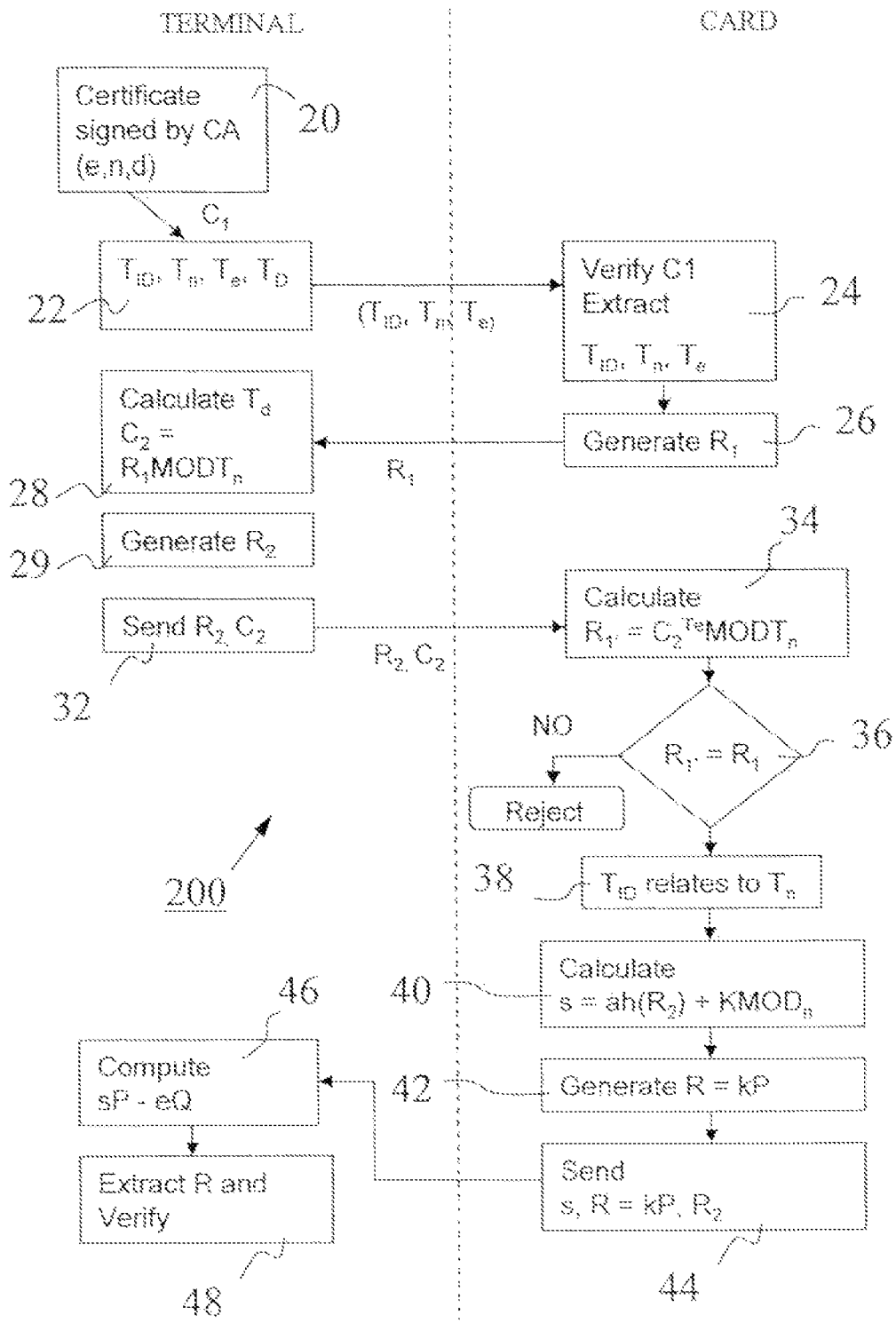
FIG. 2 is a detailed schematic representation showing a specific protocol.

Referring now to FIG. 2, a detailed implementation of the mutual authentication of the terminal and the card, according to the "challenged-response" protocol is shown generally by numeral 200. The terminal 100 is first verified by the card 102 and the card is then verified by the terminal. The terminal first sends to the card a certificate $C_1$, 20 containing its ID, $T_{ID}$, and public information including the public key. The certificate 20 may be also signed by a certifying authority (CA) so that the card may verify the association of the terminal ID $T_{ID}$ with the public key received from the terminal. The keys used by the terminal and the CA in this embodiment may both be based on the RSA algorithm.

With the RSA algorithm each member or party has a public and a private key, and each key has two parts. The signature has the form:

$$S = m^d (\bmod n)$$

where:
m is the message to be signed;
n a public key is the modulus and is the product of two primes p and q;
e the encryption key chosen at random and which is also public is a number chosen to be relatively prime to $(p-1) \times (q-1)$; and
d the private key which is congruent to $e^{-1} \pmod{(p-1) \times (q-1)}$.

For the RSA algorithm, the pair of integers (n,e) are the public key information that is used for signing. While, the pair of integers (d,n) may be used to decrypt a message which has been encrypted with the public key information (n,e).

Referring back to FIG. 2, the numbers n and e are the public keys of the CA and may be set as system parameters. The public key e may be either stored in the smart card or in an alternate embodiment hardwired into an logic circuit in the card. Furthermore, by choosing e to be relatively small, ensures that the exponentiation may be carried out relatively quickly.

The certificate 20 $C_1$ is signed by the CA and has the parameters (n,e). The certificate contains the terminal ID $T_{Id}$, and the terminal public key information $T_n$ and $T_e$ which is based on the RSA algorithm. The certificate $C_1$ is verified 24 by the card extracting $T_{ID}$, $T_n$, $T_e$. This information is simply extracted by performing $C_1^e$ mod n. The card then authenticates the terminal by generating a random number R1, 26, which it transmits to the terminal. The terminal signs the message R1 using its secret key $T_d$ by performing $R1^{Te}$ MOD $T_n$ to generate the value $C_2$, 28. Once again the key used by the terminal is an RSA key which has been originally created in such a way that the public key $T_e$ consist of a small possibly system wide parameter having a value 3, while the other part of the public key is the modulus $T_n$ which would be associated with the terminal. The terminals private key $T_d$ cannot be small if it corresponds to a small public key $T_e$. In the case of the terminal, it does not matter whether the private key $T_d$ is chosen to be large as the terminal has the required computing power to perform the exponentiation relative quickly.

Once the terminal has calculated the value $C_2$, 28, it generates a secret random number R2, 29 the terminal sends both R2 and $C_2$, 32 to the card. The card then performs a modular exponentiation 34 on the signed value $C_2$ with the small exponent $T_e$, using the terminal's modulus $T_n$. This is performed by calculating $R1' = C_2^{Te}$ mod $T_n$. If R1' is equal to R1, 36 then the card knows that it is dealing with the terminal whose ID $T_{ID}$ is associated 38 with the modulus $T_n$. The card generally contains a modulo arithmetic processor (not shown) to perform the above operation.

The secret random number R2 is signed 40 by the card and returned to the terminal along with a certificate signed by the CA which relates the card ID to its public information. The signing by the card is performed according to an elliptic curve signature algorithm.

The verification of the card proceeds on a similar basis as the verification of the terminal, however, the signing by the card utilizes an elliptic curve encryption system.

Typically for an elliptic curve implementation a signature component s has the form:

$$s = ae + k (\bmod n)$$

where:
P is a point on the curve which is a predefined parameter of the system;
k is a random integer selected as a short term private or session key, and has a corresponding short term public key R=kP;
a is the long term private key of the sender (card) and has a corresponding public key aP=Q;
e is a secure hash, such as the SHA hash function, of a message m (R2 in this case) and short term public key R; and
n is the order of the curve.

For simplicity it will be assumed that the signature component s is of the form s=ae+k as discussed above although it will be understood that other signature protocols may be used.

To verify the signature sP−eQ must be computed and compared with R. The card generates R, using for example a field arithmetic processor (not shown). The card sends to the terminal a message including m, s, and R, indicated in block 44 of FIG. 2 and the signature is verified by the terminal by computing the value (sP−eQ) 46 which should correspond to kP. If the computed values correspond 48 then the signature is verified and hence the card is verified and the transaction may continue.

The terminal checks the certificate, then it checks the signature of the transaction data which contains R2, thus authenticating the card to the terminal. In the present embodiment the signature generated by the card is an elliptic curve signature, which is easier for the card to generate, but requires more computation by the terminal to verify.

As is seen from the above equation, the calculation of s is relatively straightforward and does not require significant computing power. However in order to perform the verification it is necessary to compute a number of point multiplications to obtain sP and eQ, each of which is computationally complex. Other protocols, such as the MQV protocols require similar computations when implemented over elliptic curves which may result in slow verification when the computing power is limited. However this is generally not the case for a terminal.

Although an embodiment of the invention has been described with reference to a specific protocol for the verification of the terminal and for the verification of the card, other protocols may also be used.

The invention claimed is:

1. A method performed at a first computing device in a communication system, said method comprising:
   receiving a first signed message from a second computing device in said communication system, said first signed message generated using a signing algorithm of a first signature scheme;
   utilizing a verifying algorithm of said first signature scheme to verify said first signed message;
   signing a message by utilizing a signing algorithm of a second signature scheme different to said first signature scheme, to generate a second signed message, said second signature scheme being an elliptic curve signature scheme;
   sending said second signed message to said second computing device for verification of said second signed message using a verifying algorithm of said second signature scheme,
wherein said signing algorithm of said first signature scheme is computationally more difficult than said verifying algorithm of said first signature scheme, and
wherein said verifying algorithm of said second signature scheme is computationally more difficult than said signing algorithm of said second signature scheme, thereby allowing said first computing device to participate with less computing power as compared to the second computing device and wherein said first computing device cooperates with the second computing device for mutual authentication and said mutual authentication being rejected if either verification fails, further wherein the first computing device utilizes respective parts of said first and second signature schemes for verification and signing, said respective parts being different from corresponding respective parts used by said second computing device for verification and signing.

2. The method of claim 1, wherein said first signature scheme is an RSA type scheme.

3. The method of claim 1, wherein said first signature scheme is a DSS type scheme.

4. The method of claim 1, further comprising:
   providing a first challenge value, said first challenge value utilized in generation of said first signed message received from said second computing device.

5. The method of claim 1, wherein said message utilized in generation of said second signed message comprises a second challenge value provided to said first computing device.

6. The method of claim 1, wherein said first computing device proceeds with a transaction in response to successful verification of said first signed message and said second signed message.

7. A non-transitory computer-readable medium comprising instructions that are operable when executed by one or more processors to perform operations at a first computing device in a communication system, the operations comprising:
   receiving a first signed message from a second computing device in said communication system, said first signed message generated using a signing algorithm of a first signature scheme;
   utilizing a verifying algorithm of said first signature scheme to verify said first signed message;
   signing a message by utilizing a signing algorithm of a second signature scheme different to said first signature scheme, to generate a second signed message, said second signature schemes being an elliptic curve signature scheme;
   sending said second signed message to said second computing device for verification of said second signed message using a verifying algorithm of said second signature scheme,
wherein said signing algorithm of said first signature scheme is computationally more difficult than said verifying algorithm of said first signature scheme,
wherein said verifying algorithm of said second signature scheme is computationally more difficult than said signing algorithm of said second signature scheme, thereby allowing said first computing device to participate with less computing power as compared to the second computing device and wherein said first computing device cooperates with said second computing device for mutual authentication and said mutual authentication being rejected if either verification fails, further wherein the first computing device utilizes respective parts of said first and second signature schemes for verification and signing, said respective parts being different from corresponding respective parts used by said second computing device for verification and signing.

8. The computer-readable medium of claim 7, wherein said first signature scheme is an RSA type scheme.

9. The computer-readable medium of claim 7, wherein said first signature scheme is a DSS type scheme.

10. The computer-readable medium of claim 7, the operations further comprising:
providing a first challenge value, said first challenge value utilized in generation of said first signed message received from said second computing device.

11. The computer-readable medium of claim 7, wherein said message utilized in generation of said second signed message comprises a second challenge value provided to said first computing device.

12. The computer-readable medium of claim 7, wherein said first computing device proceeds with a transaction in response to successful verification of said first signed message and said second signed message.

13. A first computing device in a communication system, said computing device comprising one or more processors at least partially embodied in hardware, the one or more processors configured to:
receive a first signed message from a second computing device in said communication system, said first signed message generated using a signing algorithm of a first signature scheme;
utilize a verifying algorithm of said first signature scheme to verify said first signed message;
sign a message by utilizing a signing algorithm of a second signature scheme different to said first signature scheme, to generate a second signed message, said second signature scheme being an elliptic curve signature scheme;
provide said second signed message to said second computing device for verification of said second signed message using a verifying algorithm of said second signature scheme,
wherein said signing algorithm of said first signature scheme is computationally more difficult than said verifying algorithm of said first signature scheme, wherein said verifying algorithm of said second signature scheme is computationally more difficult than said signing algorithm of said second signature scheme, thereby allowing said first computing device to participate with less computing power as compared to the second computing device, and wherein said first computing device cooperates with said second computing device for mutual authentication and said mutual authentication being rejected if either verification fails, further wherein the first computing device utilizes respective parts of said first and second signature schemes for verification and signing, said respective parts being different from corresponding respective parts used by said second computing device for verification and signing.

14. The computing device of claim 13, wherein said first signature scheme is an RSA type scheme.

15. The computing device of claim 13, wherein said first signature scheme is a DSS type scheme.

16. The computing device of claim 13, wherein said one or more processors are further configured to provide a first challenge value, said first challenge value utilized in generation of said first signed message received from said second computing device.

17. The computing device of claim 13, wherein said message utilized in generation of said second signed message comprises a second challenge value provided to said first computing device.

18. The computing device of claim 13, wherein said computing device proceeds with a transaction in response to successful verification of said first signed message and said second signed message.

19. The computing device of claim 13, wherein said computing device comprises a smart card.

* * * * *